Figures 1, 2:
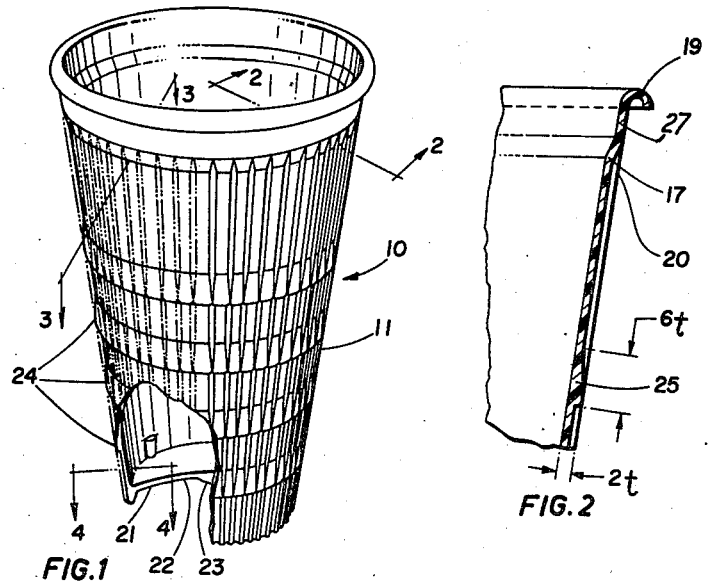

Feb. 16, 1965  J. H. SCHWARTZ  3,169,689
THIN WALLED CONTAINER
Filed May 13, 1963

Inventor

JULES H. SCHWARTZ

United States Patent Office 3,169,689
Patented Feb. 16, 1965

3,169,689
THIN WALLED CONTAINER
Jules H. Schwartz, Toronto, Ontario, Canada, assignor, by mesne assignments, to Traders Leasing Ltd., Toronto, Ontario, Canada
Filed May 13, 1963, Ser. No. 279,931
3 Claims. (Cl. 229—1.5)

This invention relates to a thin walled container especially of cup-like configuration and adapted to be molded from thermo plastic material by injection molding techniques, and is an improvement on the invention disclosed in United States patent application entitled "Thin Walled Container," Serial Number 45,094, filed July 25, 1960 and assigned to the same assignee as this application.

In recent years, various attempts have been made to provide a coffee cup or the like formed of plastic materials by injection molding. Medium impact high heat thermo plastic materials such as polystyrene may be regarded as the most suitable plastic material for such purpose having regard to the usage of such thin walled containers. Such containers should have a desirable degree of rigidity and preferably should not conduct heat rapidly.

Many of the injection molded plastic coffee cups or the like available to the present time are subject to relatively rapid heat transfer through the walls thereof to the fingers of the user leading to greater discomfort than is the ordinary experience with the well known paper cup. To overcome this disadvantage, attempts have been made to provide a foamed cellular structure plastic cup of relatively thick walled construction through which the heat transfer is negligible and therefore comfortable in use. When forming foam cellular structure plastic cups in volume production, it has not been the experience of manufacturers to date to find an economical and satisfactory means for sealing the particles of a cup in such manner as to prevent leakage during use. In fact foamed plastic cup constructions presently available on the market and generally available in the United States at this time are known to suffer severely from this disadvantage.

Injection molded plastic cups in addition to being subject to rapid heat transfer through the walls thereof are relatively brittle and may break during storage and use. The damage by breakage is ordinarily sufficiently large that it must be taken into account for comparing costs against paper cups.

In general, therefore, while various attempts have been made to provide molded thin walled containers and especially plastic cups as a substitute for corresponding paper products, the products formed of plastic materials have not all been successful to a degree that it could be said at this time that plastic articles are replacing paper containers though the attempt for a practical substitution is apparent.

In the forming of thermo plastic coffee cup structures by injection molding, it has been found that the minimum wall thickness for material saving is of the order of 0.018″ (of an inch) and that any lesser wall thickness which could afford a material saving delivers a product of unsatisfactory rigidity and of unduly frangible properties. Conversely a wall thickness substantially in excess of this figure while producing a satisfactory cup rendered the material cost of such cups too great to make them competitive with paper cups. However, when using a wall thickness as low as this it has been found according to this invention that some form of strengthening member must be added to the cup to provide sufficient rigidity and strength in use, over the greater part of the wall of the cup.

In the aforesaid prior application strengthening members in the form of both vertical and horizontal ribs are disclosed which additionally dissipate heat from the surface of the cup direct to the atmosphere away from the fingers of the person holding the cup and minimizing the area of contact between the cup and the fingers. Various improvements on the aforesaid features have now been developed with a view to further strengthening the cup as a whole while retaining the economy of material and low heat transfer properties of the said cup.

Having regard to the foregoing, it is the main object of this invention to provide a thin walled container formed of thermo plastic material of a form adapted to be injection molded and characterized by a sectional contour affording rigid cracking resistance and low heat transfer characteristics.

It is another object of the present invention to provide a thin walled container structure adapted for fabrication from a thermo plastic material by injection molding techniques in which the side wall is provided with a plurality of substantially equally spaced substantially parallel rib-like formations extending from a surface of a thin wall and forming a part of the latter, the effective sectional diameter of each of said rib-like formations being of the order of greater than twice the thickness of said wall and the maximum distance between said ribs being less than twenty times the thickness of said wall and preferably of the order of about ten times the thickness of said wall.

It is a further object of the present invention to provide a container structure generally in the form of a frusto conical coffee cup or the like and having an inwardly directed convex base adapted for thermal expansion substantially to maintain its convexity in part at least.

It is a further object of the present invention to provide a thin walled container having the foregoing advantages which is provided with transverse strengthening means of wedge-shaped cross-section extending around the cup intermediate its ends increasing and enhancing the strength and crush resistance thereof.

Other objects of the invention will be appreciated by a study of the following specification taken into conjunction with the accompanying drawings.

Figures 3, 4:
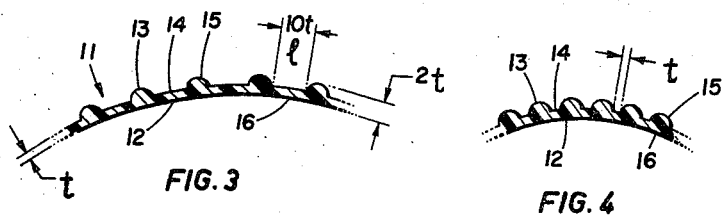
Figure 5:
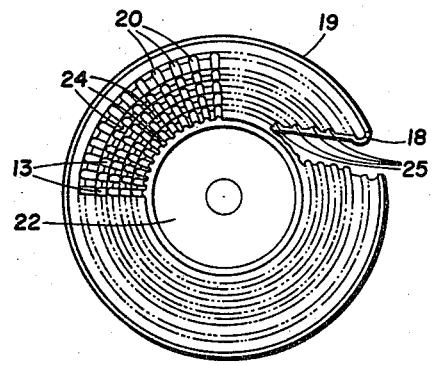

In the drawings:
FIGURE 1 is a perspective view of a thin walled container structure of the invention of frusto conical coffee cup form having a portion thereof cut away to reveal the form of the base or bottom wall thereof;
FIGURE 2 is a section on the line 2—2 of FIGURE 1;
FIGURE 3 is a section on the line 3—3 of FIGURE 1;
FIGURE 4 is a section on the line 4—4 of FIGURE 1; and,
FIGURE 5 is a bottom view of FIGURE 1 partly broken away.

Referring now to the drawings, the thin walled structure 10 disclosed herein by way of example only is characterized by at least one wall portion 11 being the frusto conical wall of the coffee cup structure shown of improved form by virtue of sectional figures displayed in FIGURES 3 and 4.

In the sectional illustrations of FIGURES 3 and 4 being sections on the lines 3—3 and 4—4 of FIGURE 1, the wall 11 is shown comprised of wall base portion 12 of predetermined thickness "$t$" about 0.018. Integrally formed therewith are the ribs or beads 13 preferably extending from one surface being the outer surface 14 thereof outwardly to describe a rib body 15 of effective diameter, i.e. of minimum transverse dimension of the order of between 0.036″ and 0.09″.

The distance between the ribs or beads should be of a predetermined maximum whereby the unsupported portion 16 of wall 12 is of satisfactory maximum length in relation to its thickness to ensure the desired rigidity in the unsupported portion. Accordingly, the unsupported distance "$l$" should be the order of 0.27″ maximum and preferably of a value of about 0.126″. In FIGURE 3, "l" is illustrated as equal to 10 "t." In FIGURE 4 it will be observed that by virtue of the frusto conical nature of the wall, 11, the unsupported distance "l" in the region 4—4 is of the order of about 0.18″.

Thus ribs 13 will be seen to coverage towards the lower portion of the container to a greater or lesser extent depending upon the degree of taper exhibited thereby and the term substantially parallel is intended to describe such ribs whether converging or otherwise.

The terminal edges of the container should be formed such as to endow the structure with the additional rigidity and functional appeal on contact with the user. Thus the upper terminal band 17 of structure 10 is integrally joined with the upper extremities 20 of the ribs 13 substantially in the manner indicated in FIGURE 2, and outwardly offset and merges with flange portion 18 of thickness "t" to reduce weight turned over to provide a rounded lip thereon.

In order to overcome the thermal expansion effects or other effects which may result in distortion of bottom wall 21 integraly formed with and forming a part of structure 10, the same preferably exhibits an inward convexity defined by the inward curvature 22 terminating centrally in an outwardly directed sprue formation 23 defining the mold injection point for material injected to form the container structure in the mold in an injection molding machine. The convexity of wall 21 permits the same to expand on heating to greater convexity or to be stretched to lesser convexity due to heating of the walls 11 and their circumferential expansion to effective greater diameter in the regon of the bottom wall. In order to add additional rigidity to the instant structure transverse ribs 24 are provided intersecting longitudinal ribs 13 intermediate the top and bottom of the container. Ribs 24 will be seen to be of generally wedge-shaped cross-section and have a thickness of not less than 0.036″ the outwardly directed face 25 thereof being substantially parallel to the vertical axis of the container and of a width equal to between about 0.054″ and 0.108″ to increase the strength thereof a substantial portion of faces 25 thereof being lower than the peaks of ribs 13 and hence not affecting the area of contact with the fingers. From FIGURE 5 it will also be seen that ribs 24 are graduated in size so that the inner diameter of an upper rib 24 is greater than the outer diameter of the next adjacent lower rib 24. The locations, numbers and dimensions of ribs 24 will be to some extent dependent upon the degree of taper in the shaping of the container as a whole in order that the advantages of injection molding techniques may be retained while retaining the strengthening features noted without substantially increasing the area of contact with the fingers.

Further rigidity is provided in the instant container by a smooth, stepped portion or terminal band 17 extending around the upper end of the container adjacent flange portion 18 and preferably of a thickness of about 0.018″. Flange 18 is also characterized by an absence of ribs 13, the outwardly directed face 27 thereof being substantially parallel to the plane of side wall 11 thereby improving the consumer appeal while not increasing the area of contact with the fingers.

Tests have shown that contact of the hand of the user with the closely spaced rib-like formation of the container walls permits a spacing of the surfaces of the fingers from the unsupported wall portions extending between the ribs thus effectively to insulate the finger surfaces and to present a relatively cool exterior for handling of hot liquids. Furthermore the spaces between the ribs provide air-circulating heat dissipating channels by means of which heat may escape directly into the air without contact with the fingers of the user. The rib-like formation of the side walls in the manner described obstructs progressive fracture whereby slight damage to the container does not render it incapable of practical use.

Specific examples of the various measurements of a coffee cup made according to the present invention are now given though clearly larger or smaller containers may require some variation from such figures within the general limits above described.

Wall thickness="t"=0.018″
Rib height=2"t"=0.036″
Rib spacing, upper=4"t"=0.072″
Rib spacing, lower="t"=0.018″
Horizontal rib face=6"t"=0.108″

While the invention has been described with reference especially to a cup-like structure adapted particularly to the serving of coffee and of a form disposable by virtue of its cheapness and susceptibility to mass production in satisfactory volume by known techniques, it will be appreciated that inherent aspects of the invention are to be found in the combination of ribs and wall structure coming within the requirements set forth in this specification. The removal of some of the material from the ribs such as to define indented configurations thereof representing alphabetical or other designs, does not materially influence the utility of the resulting container as a whole. It has been found that the unsupported wall thickness need only be of the order of about ⅓ the wall thickness demanded in prior plastic wall structures for the same purpose. In addition and especially in coffee cup structures, the material saving as compared with previous structures of substantially uniform wall thickness is in excess of 20% representing a large factor in the cost of the article. Obviously the wall structure formation of the invention may be utilized in thin walled containers of other forms than that particularly disclosed herein and accordingly the disclosure herein does not intend to limit the utility of the invention to the specific application disclosed but rather only to the subject matter set forth herein having regard to the scope of the following claims and the prior art.

What I claim is:

1. A molded plastic drinking cup of substantially uniform waterproof composition throughout, having a generally frustroconical shape, comprising: a solid side wall of substantially uniform thickness and a plurality of longitudinal ribs formed integrally as a part of said wall, said ribs:
    (a) being formed on the outer face of the side wall, evenly spaced about the circumference thereof;
    (b) extending longitudinally along the conical wall surface;
    (c) having a width along the circumference of the cone of 0.096″ to 0.09″;
    (d) extending beyond the wall, at least 0.018″;
    (e) the maximum distance between the ribs being 0.27″; and
at least one annular rib formed integrally with said side wall on said outer surface of generally wedge-shaped cross-section and providing strengthening means to said side wall; the taper on said side wall co-operating with said longitudinal and annular ribs to provide draft for said container in one direction only.

2. A molded plastic drinking cup of substantially uniform waterproof composition throughout, having a generally frustroconical shape, comprising: a solid side wall of substantially uniform thickness and a plurality of longitudinal ribs formed integrally as a part of said wall, said ribs:
    (a) being formed on the outer face of the side wall, evenly spaced about the circumference thereof;
    (b) extending longitudinally along the conical wall surface;
    (c) having a width along the circumference of the cone of 0.096″ to 0.09″;
    (d) extending beyond the wall, at least 0.018″;
    (e) the maximum distance between the ribs being 0.27″; and a plurality of annular ribs formed integrally with said side wall between said upper end and the bottom of said container and establishing discontinuities between said longitudinal ribs characterized by thickened regions affording increased rigidity; the taper on said side wall co-operating with said longitudinal and annular ribs to provide draft for said container in one direction only.

3. A molded plastic drinking cup of substantially uniform waterproof composition throughout, having a generally frustroconical shape, comprising: a solid side wall of substantially uniform thickness and a plurality of longitudinal ribs formed integrally as a part of said wall, said ribs:

(a) being formed on the outer face of the side wall, evenly spaced about the circumference thereof;
(b) extending longitudinally along the conical wall surface;
(c) having a width along the circumference of the cone of 0.096" to 0.09";
(d) extending beyond the wall, at least 0.018";
(e) the maximum distance between the ribs being 0.27"; and a plurality of annular ribs formed integrally with said side wall on said outer surface of generally wedge-shaped cross-section and providing strengthening means to said side wall, said ribs being of varying diameter with the inner diameter of an upper said rib being greater than the outer diameter of a lower said rib; the taper on said side wall co-operating with said longitudinal and annular ribs to provide draft for said container in one direction only.

References Cited by the Examiner
UNITED STATES PATENTS

| | | |
|---|---|---|
| 1,247,678 | 11/17 | Hentschel. |
| 2,530,124 | 11/50 | Kieckhefer _____ 215—10 |
| 2,805,790 | 9/57 | Smucker _____ 220—97 |
| 2,853,222 | 9/58 | Gallagher _____ 229—1.5 |
| 3,045,887 | 7/62 | Caine _____ 229—1.5 |

FRANKLIN T. GARRETT, Primary Examiner.